United States Patent [19]

Lindstrom

[11] 4,011,365

[45] Mar. 8, 1977

[54] ELECTRIC ACCUMULATOR
[75] Inventor: Olle Birger Lindstrom, Taby, Sweden
[73] Assignee: AB Olle Lindstrom, Taby, Sweden
[22] Filed: Sept. 26, 1975
[21] Appl. No.: 617,153
[30] Foreign Application Priority Data
Oct. 3, 1974 Sweden .............................. 7412505
[52] U.S. Cl. .................................. 429/60; 429/219; 429/221
[51] Int. Cl.² ........................................ H01M 10/34
[58] Field of Search ............... 136/6 GC, 3, 20, 111, 136/107, 25, 94, 101, 107; 429/60, 219, 221
[56] References Cited
UNITED STATES PATENTS

| 2,542,710 | 2/1951 | Ruben | 136/107 |
|---|---|---|---|
| 2,927,951 | 3/1960 | Lindstrom | 136/20 X |
| 2,942,052 | 6/1960 | Bourke et al. | 136/20 X |
| 3,017,448 | 1/1962 | Cahan | 136/20 X |
| 3,170,818 | 2/1965 | Horn et al. | 136/6 GC |

Primary Examiner—Anthony Skapars
Attorney, Agent, or Firm—Doane, Swecker & Mathis Burns

[57] ABSTRACT

The novel cell uses silver oxides as positive electrode material and iron as negative electrode material in an alkaline electrolyte with the silver oxides being reduced to mainly metallic silver during the discharge of the cell. This cell is sealed so as to bring the gases developed in the cell into contact with the negative as well as the positive material thus eliminating the gases. This new sealed alkaline cell gives outstanding performance with respect to energy and power density and cycling life.

10 Claims, 1 Drawing Figure

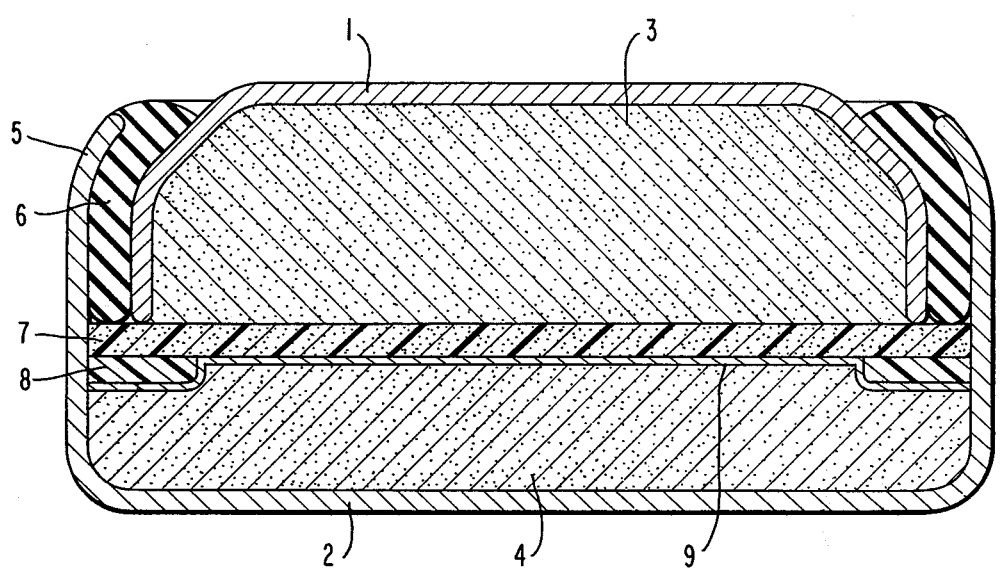

ELECTRIC ACCUMULATOR

The evolution of the electrical and electronic technology has created demands for new electrical accumulators with, in certain respects, different properties than the presently used conventional electrochemical power sources. Thus a high energy density is given a premium in the case of power sources for hearing aids, electronic calculators, etc. Such power sources should furthermore be completely sealed and capable of operation in any position.

The so called mercury cell which was invented by Samuel Ruben (see U.S. Pat. No. 2,542,575 and others) satisfies such requirements to a certain degree and has found extensive use in several of the applications mentioned above except, however, in space applications. The mercury cell causes an environmental problem because of the fact that used batteries frequently end up in the incinerators of the waste disposal system, where the mercury will be emitted to the surroundings from the stack. These batteries are also rechargeable only to a limited extent and, therefore, the energy produced with these batteries, is fairly expensive. Therefore, similar batteries have been developed for these purposes with a longer life cycle, which are based on the system cadmium/nickel oxide with alkaline electrolyte and with sealed configuration. The energy density with these so called nickel cadmium accumulators, for instance in the button cell configuration, is, however, much smaller than with the corresponding mercury batteries. This is a great disadvantage because of the need for frequent charges.

The sealed nickel cadmium battery with so called sintered electrodes is frequently used in more demanding applications in aircraft, space and defense technology, in spite of its fairly low energy density. However, many attempts have been made to improve the batteries of the state of the art, such as the silver-zinc battery, or to develop entirely new concepts like the nickel hydrogen battery for these purposes. These efforts have, however, not yet given results of practical significance.

The new power source according to this invention, which is developed for the applications mentioned above, is based on the system iron/silver oxide which up to now has received but little attention. It has now been found that very important and unexpected advantages are gained if this electrode system is arranged in completely sealed cells and batteries. The new power source has a very high energy density, on the same level as the silver-zinc battery, but it exhibits furthermore the good cycling properties of the nickel/cadmium battery. Since the new power source does not use mercury, the environmental problem of the mercury cells is eliminated in a radical way. The new power sources can be designed in any sealed configuration used with alkaline batteries, see for instance U. Falk and A. Salkind "Alkaline Storage Batteries", (John Wyley and Sons, Inc., 1969), for instance as button cells, prism cells or cylindrical cells. The invention refers to a rechargeable electrochemical cell or an electric accumulator comprising such cells containing a positive electrode in which the active material in its fully charged condition contains mainly silver oxides and in its fully uncharged condition mainly metallic silver, an electrolyte comprising a water solution with alkaline reaction and a negative electrode in which the active material in its charged condition is mainly metallic iron, as well as other means which are required for the function of the cell characterized in that the cell is sealed so that the gases being developed within the cell are brought into contact with the negative as well as the positive electrode.

Alkaline batteries containing silver oxides as positive electrode material are well-known within the technology as well as alkaline batteries with negative iron electrodes. Nickel/cadmium, silver/cadmium, silver/zinc and mercury/zinc batteries are since long made in a sealed configuration, see Falk and Salkind's book, page 14, 190, 375 and 408. The above sealed silver batteries of the state of the art use an excess of negative electrode material and the fully discharged silver electrode consists mainly of metallic silver. A corresponding silver-iron battery has, on the other hand, never been conceived, probably because of anticipated gassing difficulties. Silver-iron batteries have, however, been made in a vented configuration with gases developed during over-charge being vented to the atmosphere. An attempt has also been made to make a sealed silver-iron battery in which the active material in the positive electrode in its fully discharged condition consists of the silver oxide $Ag_2O$ for the purpose of a very stable and high cell voltage at the expense of energy density, German "Auslegeschrift" No. 1177225. Also this inventor did not think it feasible to make a gas-tight cell in which the silver oxide material is fully utilized so as to get a sealed cell with very high energy density which is the object of the present invention.

The cell according to the present invention therefore represents a completely unexpected discovery. The present cell seems to operate with different mechanisms for gas elimination than the earlier known sealed alkaline cells, which puts the new power source in a different technical category. The reaction which probably is of a different pattern also has the consequence that the new power source can be dimensioned and designed after partly different and more advantageous principles than the sealed alkaline cells of the state of the art. The sealed silver-iron/cell according to the present invention therefore exhibits much improved performance, e.g. with respect to life, compared to a related cell in an open, ventilated configuration. A similar comparison between the nickel-cadmium battery in sealed, as opposed to open configuration puts the sealed version at a disadvantage.

The electrode reactions in the new electrochemical cell are, respectively, under normal conditions the same as in a conventional alkaline iron/nickel oxide cell on the negative side and as in a conventional alkaline zinc-silver cell on the positive side. The iron-electrode thus discharges first to the ferrous ($Fe^{++}$) and then the ferric ($Fe^{+++}$) state. The reaction scheme of the positive electrode is, however, not yet completely known, see Falk and Salkind, page 156. The net reaction can be summarized: $2Fe + 3\ AgO + 3H_2O \rightarrow 2\text{-}Fe(OH)_3 + 3Ag$, when the discharge is carried to the ferric state. The cell voltage is generally within the range 0.7–1.4 V and depends on the state of charge of the electrodes, the current density, etc.

The problems of the sealed cells are, however, not caused by conditions during normal operation but rather determined entirely by the conditions prevailing during overcharge, deep discharge, self discharge, and cell reversal. During these conditions hydrogen and/or oxygen will be developed in the cell, which gases must be eliminated to prevent the cell from bursting because of the gas pressure. The state of the art with sealed nickel-cadmium, silver-zinc, and silver-cadmium batteries is described in Falk and Salkind's book cited above. The development of hydrogen is avoided by means of an excess of the negative electrode material: cadmium or zinc. During overcharge oxygen is developed at the positive electrode which is then eliminated in reaction with cadmium and zinc metal of the negative electrode covered by electrolyte. Gas development during cell reversal can be retarded by means of so called antipolar materials, that is electrode material with opposite polarity, see Falk and Salkind's book, p. 191.

The difficulties to control hydrogen development in a simple manner with sealed cells with nickel oxide cathodes seem to have prohibited thoughts to test the iron anode in sealed cells because of the property of the iron anode to produce hydrogen during self discharge. It has, however, been found with power sources according to this invention that the silver oxide electrode reacts easily with hydrogen during conditions which prevail in power sources according to the invention. This is utilized in a particularly advantageous embodiment which is characterized in that the active iron, counted on the ferric state, is not present in excess compared to the active silver oxide material, but to the contrary in a certain, but frequently small deficit. This represents a principle for sealed cells which is the reversal of the well-known principle with sealed alkaline cells, where the negative material should be present in an excess to avoid hydrogen evolution. Since the batteries during overcharge then first develop hydrogen (which reduces silver peroxides in the positive electrode and thus prevents oxygen development) a number of important advantages are gained. The hydrogen is thus diffusing easily from one electrode to the other compared to oxygen. One can therefore use a larger distance between the electrodes and a more efficient separator than with the sealed cells according to the state of the art. (Falk and Salkind's book discusses these problems for instance, on page 203 and in chapter 3.)

The life of the separator can be improved because of the absence of oxygen in the nascent state and the reduced content of aggressive silver peroxides. These circumstances, which are unexpected and give very good properties for power sources according to the invention, produce a most important improvement in the weaker point of silver cells, that is life. It seems also that the iron electrode exerts a direct life-increasing effect on the silver oxide electrode itself. It is difficult to explain the life-increasing effect but it could be caused by the influence of hydrogen and/or colloidal iron compounds which influence the structure of the silver oxide electrode during the charge.

Overcharge with high current density can, however, cause a certain oxygen development at the positive electrode. In such a case direct recombination will occur at the positive electrode together with a certain chemical and/or electrochemical oxidation of the active material in the negative electrode.

There are no problems caused by self-discharge of the iron electrode. The hydrogen being developed is discharging the positive electrode by reduction so that the balance between the two electrodes is maintained. At cell reversal oxygen is developed at the iron electrode which is then reduced electrochemically at the silver electrode, which, after all, is an efficient oxygen electrode. At cell reversal with high current density the silver electrode may be forced down to hydrogen evolution, in which case chemical recombination will take place.

The above discussion has pointed out a number of unexpected advantages for the embodiment of the invention which is particularly valuable with a minor excess of positive electrode material. The invention is, however, not limited to this embodiment. Power sources according to the invention give also other advantages, above all long life, when the negative electrode material is in excess, compared to the corresponding vented designs. In this case oxygen is developed during overcharge as in a conventional, sealed alkaline cell. However, the oxygen does not seem to react with $Fe^\circ$ in an analogous manner with the cadmium electrode but rather with $Fe^{++}$ which is oxidized to $Fe^{+++}$ so as to be reduced again to $Fe^{++}$ electrochemically. At cell reversal hydrogen is developed at the positive electrode which is then reacting preferably with $Fe^{+++}$ in the negative electrode material. The common denominator for the embodiment with negative electrode material in excess and in deficit, is thus that it is possible to cope with cell reversal without the use of antipolar masses. This is due to the unique properties of the iron/silver oxide system. The embodiment with negative iron material in excess also seems to produce a direct life-increasing effect on the silver oxide electrode of the same kind as has been discussed for the embodiment with negative material in deficit.

It is apparently a very important advantage that the technical effects of the invention, primarily a gas-eliminating action and better life, are not eliminated with the negative material in excess. This gives safety for occasional activity variations and makes possible a near stoichiometric balance of the active electrode materials with just a minor deficit of negative material. The ratio between the electrochemically active negative and positive materials in the electrodes should be within the range 1.50 – 0.50 (counted as equivalents in the net reactions $Fe^\circ \rightarrow Fe^{+++}$ and $Ag^{++} \rightarrow Ag^\circ$ whereby a particular advantageous range is 1.00 – 0.70 and an even more advantageous range 0.95 – 0.90.

The expert can utilize the invention with many different kinds of battery types with parallel and/or series connected cells, so as to obtain desired electrical data, and in any desired configuration, for instance prismatic, cylindrical or button cells. It is also possible to build batteries with bipolar electrodes containing iron and silver (II) oxide in principle. The unexpected good gas-eliminating action implies that silver-iron cells according to the invention can be designed for low gas pressures, frequently below about 0.5 MPa, which gives simple and cheap mechanical design. If very high lives are desired, for instance 1,000 cycles or above, it is recommended to use all measures being recommended in Falk and Salkind's book, see for instance page 339. A particularly advantageous embodiment is to fill up particularly the porous silver oxide electrode only partially with electrolyte, so, it will contain also a gas phase, which can be achieved by a partially hydrophobic structure and/or suitable pore diameters in the electrode compared to the pore diameters in a separator and in the iron electrode to give the desired distribution of the electrolyte. With the embodiment with excess of negative material it can be of advantage to arrange a gas phase in the iron electrode in a similar way. The minimization of the electrolyte quantity by means of a gas phase particularly in the positive electrode by partial hydrophobization does also increase life considerably. The electrolyte volume in the positive electrode can thereby be only about 5 - 10% of the total electrode volume with a volume for the gas phase amounting to 20 - 40% of the total volume.

It has proved suitable to use smaller pores in the iron electrode than in the silver oxide electrode whereas the free volume in the charged negative electrode should be larger than corresponding volume in the positive electrode. For this purpose the electrodes can be impregnated with a 5% aqueous dispersion of polytetrafluorethylene followed by heat treatment at 300° C. during 10 minutes.

The silver oxide electrode can be manufactured for instance according to Andre's descriptions (Bull.Soc.-Franc. Electriciens, 1941), p. 132; according to Falk and Fleischer; "Zinc-silver oxide batteries", p.199, (John Wyley & Sons, 1971) or according to the Swedish Pat. No. 360952. Iron electrodes with a high capacity density can with advantage be manufactured according to the formulations in the Swedish Pat. No. 360952, but may also be manufactured by plastic binders, so called pressed electrodes, or according to the original formulations by Edison.

The iron electrode can contain additives of smaller quantities of cadmium, particularly in the case of an excess of negative material. The separator can be made of alkali resistant porous materials, such as cellulose, cellophane, nylon, polypropylene, rubber, etc. (see Falk & Fleischer). When a particularly high life is required one may use so called inorganic separators according to U.S. Pat. No. 3,625,777, or so called three layer separators with an inert peroxide-resistant material, for instance zirconium dioxide, magnesium oxide etc. at the positive electrode followed by a layer which prevents silver dendrites, for instance asbestos, or some other material with high tortuosity, and finally a conventional separator, for instance non-woven nylon or polypropylene near the iron anode.

The electrolyte is preferably a water solution of alkali-hydroxide, for instance potassium hydroxide, with a normality preferably within the range of 1 - 10 molar. The electrolyte can contain gel forming substances and zincate as is described in the U.S. Pat. No. 2,542,575.

The invention shall now be exemplified by means of the accompanying single figure of drawing, which shows a button cell analogous in structure to a mercury cell according to the U.S. Pat. No. 2,542,575. I have chosen this embodiment because it permits a simple and short description of the scope of the invention. It should be no difficulty for the man skilled in the art to design and manufacture other types of batteries such as prismatic cells, cylindrical cells, batteries with bipolar electrodes, etc., according to the invention. The button cell according to the drawing is built of two cans 1 and 2, one of these 1 contains the iron electrode 3 and the other the silver oxide electrode 4. The cell is sealed to the environment by crimping the edge 5 of the can 2 towards the can 1. The two cans are electrically insulated from each other by means of the insulating and sealing material 6, which also may have an adhesive function. The separator 7 is situated between the two electrodes and is strengthened with the ring 8. The cans can be made of steel plate with a nickel coating with a total thickness of 0.035 mm. The insulating layer 6 can be made of a vulcanized coating of neoprene rubber or be made of a heat curing epoxy resin. The ring 8 can be made of, for instance, polystyrene. The electrode materials can be made for instance according to Falk and Fleisher, as well as according to the Swedish Pat. No. 360952. A particularly advantageous embodiment is thereby to arrange larger pores in the silver oxide electrode, for instance 50 - 100 $\mu$m than in the iron electrode which can have pores of the size 15 - 20 $\mu$m, by means of a corresponding size of the pore-forming particles, according to the Swedish Pat. No. 360952.

The electrolyte can be 5-N KOH and is in this particularly advantageous embodiment used in a deficit relative to the total available free volume in the cell in order to leave a gas space in the positive electrode amounting to about 10% of the total volume of the positive electrode. The separator is made of micro-porous nylon with pores 5 - 10 $\mu$m or below. A thin layer of plasma sprayed porous zirconium oxide 9 protects the separator material from direct contact with the silver oxide electrode. The electrode materials are so balanced that the ratio between the equivalents of negative material ($Fe^{\circ} \rightarrow Fe^{+++}$) and positive material ($Ag^{++} \rightarrow Ag^{\circ}$) is 0.94, in which case the cell has a capacity of 125 mAH negative electrode material with a capacity density of 1.1 mAh/cm$^3$ and 132 mAh positive material with a capacity density of 1.0 mAh/cm$^3$.

By way of illustration only, silver oxide and iron electrodes, respectively, which are suitable for use in the present invention can be formulated as follows:

EXAMPLE 1

An iron electrode is made by compacting a mixture of carbonyl iron powder and rock salt powder at 1.8 ton/cm$^2$. The bulk density of the iron powder is 0.8 g/cm$^3$ and the particle size about 5$\mu$m. The salt has been ground to a particle size below 30$\mu$m. One part by weight of salt is mixed with two parts by weight of iron powder. The mold could be circular with a diameter of 10 cm and the powder charge adjusted so as to give a disc with a thickness of 0.24 cm in the compacted green condition. The disc is sintered in hydrogen at 650° C during 1 hour. The salt is then leached out in water with KOH added to pH 12. After drying, electrodes of required size are punched out of the disc.

EXAMPLE 2

An iron electrode is made by loose sintering of the iron powder of Example 1. The mold is filled with the iron powder to a thickness of 1.0 cm. Sintering is then taking place at 750° C in a hydrogen atmosphere during 45 minutes. The disc is then compacted to a thickness of 0.24 cm. Electrodes of the required size are punched out of disc.

EXAMPLE 3

An iron electrode is made as in Example 2 but with a powder of pigment grade iron oxide, Fe$_2$O$_3$, substituted for the iron powder. The iron oxide powder is made by roasting FeSO$_4$ in air followed by grinding.

EXAMPLE 4

An iron electrode is made by compacting the iron powder of Example 1, to which has been added 4% by weight of polyethylene powder, Microthene MN 722, to a porosity of 65%. The disc is sintered in hydrogen at 120° C during 30 minutes. Electrodes of required size are punched out of the disc.

EXAMPLE 5

An iron electrode is made as in Example 1 but with 6% by weight of the iron powder substituted for the same weight of finely ground cadmium oxide.

EXAMPLE 6

A silver oxide electrode is made by compacting a mixture of the silver oxide $Ag_2O$ with a bulk density of 1.2 g/cm$^3$ and rock salt powder ground to a particle size below 30 $\mu$m. Three parts by weight of the silver oxide are thoroughly mixed with one part by weight of the salt powder with mixture being finally passed through a 270 mesh screen. The compaction pressure is 1.5 ton/cm$^2$ and sintering is taking place at 400° C in air during 25 minutes. The salt is leached out with water during 24 hours whereafter the electrode is anodically oxidized in 1-N KOH at 10 mA/cm$^2$ during 48 hours.

EXAMPLE 7

The silver oxide powder of Example 6 is compacted directly into the electrode can 2 of FIG. 1 to a porosity of 65%.

EXAMPLE 8

The silver oxide powder of Example 6 is mixed with 3% by weight of polyethylene binder, Microthene MN 722, and compacted directly into the can to a porosity if 68%. The can is heated in air to 120° C during 10 minutes.

EXAMPLE 9

A silver oxide electrode is made as described in Example 6 but with equal parts of silver oxide and salt powder. After leaching the disc is compacted to a porosity of 62% prior to the electrochemical formation procedure.

A suitable electrolyte containing zincate is made by dissolving 2% by weight of zinc oxide, ZnO, in hot 30% solution is cooled and filtered prior to use.

A battery cell according to the drawing, with a diameter of 1.13 cm and a height of 0.52 cm thus delivers 125 mAh at a discharge current of 2 mA within the voltage range 1.4 V – 0.9 V. The cell can take overcharge and deep discharge without being damaged and with no leakage of gases or electrolyte to the surroundings. The life is in excess of 500 deep cycles compared to only a few hundreds of cycles in the corresponding vented design. The corresponding commercially available nickel-cadmium cells in button cells give only 20 – 30 mAh, which illustrates the excellent properties of the new power source. This excellence is also found with other cells and battery configurations.

The above example shows a particularly advantageous embodiment with negative material in a minor deficit and with an only partially electrolyte flooded silver oxide electrode to facilitate hydrogen from the anode to come into contact with the cathode material. Sufficient gas contact is developed only thanks to the sealed design according to the invention with no particular means to provide a separate gas phase. The developed gases thereby dissolve in the electrolyte phase and diffuse to opposite electrodes. However, there are also other reasons for the cell to contain a minor quantity of gas when it is being manufactured, preferably hydrogen when there is a deficit of negative material and oxygen with an excess of negative material.

The illustration in the drawing may serve as a starting point for many modifications, for instance a modification with a hydrophobic silver oxide electrode and 1.2 mm separation, which gives a life improvement towards the level of 1,000 cycles at a capacity level of about 100 mAh. An excess of negative material corresponding to the equivalent ratio 1.10 gives under similar conditions a capacity of about 110 mAh and a life of several hundreds of cycles. Illustrations of such modifications are as follows:

The silver electrode is manufactured as described in Example 6 but with larger salt particles, about 80 m. This electrode is used in a button cell according to FIG. 1 with the iron electrode iron made according to Example 1. The pores of the negative electrode are smaller than the pores of the positive electrode.

The silver electrode is manufactured as described in Example 6 and is then impregnated with a Teflon dispersion containing 3% by weight of polytetrafluorethylene. The electrode is dried 24 hours at 80° C and then heat treated at 300° C during 20 minutes. The electrode is used in a button cell together with an iron electrode according to Example 3. The electrolyte contains 30% by weight of KOH and 1% by weight of potassium zincate counted as ZnO.

Since the new power source can be considered a combination of components which themselves are well-known the expert should not need further examples so as to be able to use the invention for other types of cells and batteries than the button cell, and thereby develop the large and unexpected advantages which are characteristic for the new power source. Similarly, the above examples of positive and negative electrode compositions are illustrative only and variations of these within the scope of the present invention will readily suggest themselves to the man skilled in this art.

What is claimed is:

1. Rechargeable electrochemical cell or electric accumulator comprising such cells containing a positive electrode in which the active material in its fully charged condition comprises silver oxides and in its fully discharged condition comprises silver, an electrolyte comprising a water solution of an alkali hydroxide and a negative electrode in which the active material in its charged condition comprises metallic iron, said cell being sealed so that the gases being developed within the cell are brought in contact with the negative as well as the positive electrode.

2. Cell or accumulator according to claim 1 wherein the number of equivalents of active material in the negative electrode does not exceed the number of equivalents of active material in the positive electrode.

3. Cell or accumulator according to claim 1 wherein the ratio between the number of equivalents of active material in the negative electrode to the number of equivalents of active material in the positive electrode is within the range 1.00 to 0.70.

4. Cell or accumulator according to claim 1 wherein the ratio between the number of equivalents of active material in the negative electrode to the number of equivalents of active material in the positive electrode is within 0.95 – 0.90.

5. Cell or accumulator according to claim 3 wherein a gas phase is provided in the positive electrode.

6. Cell or accumulator according to claim 4 wherein a gas phase is provided in the positive electrode.

7. Cell or accumulator according to claim 5 wherein the pores in the negative electrode are smaller than the pores in the positive electrode.

8. Cell or accumulator according to claim 6 wherein the pores in the negative electrode are on the average smaller than in the positive electrode.

9. Cell or accumulator according to claim 1 wherein the electrolyte contains zincate.

10. Cell or accumulator according to claim 1 wherein the negative electrode contains cadmium additive.

* * * * *